United States Patent [19]

Takeo

[11] Patent Number: 5,533,142
[45] Date of Patent: Jul. 2, 1996

[54] METHOD FOR ADJUSTING READ-OUT AND PROCESSING CONDITIONS FOR MAGEN IMAGES

[75] Inventor: Hideya Takeo, Kanagawa-ken, Japan

[73] Assignee: Fuji Photo Film Co., Ltd., Kanagawa, Japan

[21] Appl. No.: 136,022

[22] Filed: Oct. 14, 1993

[30] Foreign Application Priority Data

Oct. 15, 1992 [JP] Japan ................................. 4-277541

[51] Int. Cl.$^6$ ............................ G06K 9/00; G06K 9/34; G01N 23/04; G06F 15/00
[52] U.S. Cl. ...................... 382/128; 382/173; 382/180; 250/584; 250/587; 364/413.13
[58] Field of Search ............................... 382/6, 9, 50, 61, 382/34, 27, 132, 174, 128, 180, 173, 205, 217; 364/413.13, 413.23; 250/584, 587

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,638,162 | 1/1987 | Tanaka et al. | 250/327.2 |
| 4,682,028 | 7/1987 | Tanaka et al. | 250/327.2 |
| 4,829,181 | 5/1989 | Shimura | 250/327.2 |
| 4,873,437 | 10/1989 | Nakajima | 250/587 |
| 4,887,305 | 12/1989 | Shimura | 382/51 |
| 4,950,894 | 8/1990 | Hara et al. | 250/327.2 |
| 4,962,539 | 10/1990 | Takeo et al. | 382/9 |
| 5,042,074 | 8/1991 | Takeo et al. | 382/9 |
| 5,073,961 | 12/1991 | Takeo | 382/27 |
| 5,272,339 | 12/1993 | Shimura et al. | 250/384 |

FOREIGN PATENT DOCUMENTS

| | | | |
|---|---|---|---|
| 56-11395 | 2/1981 | Japan | G21K 4/00 |
| 61-5193 | 2/1986 | Japan | G06F 15/62 |
| 61-280163 | 12/1986 | Japan | H04N 1/04 |
| 63-183434 | 7/1988 | Japan | G03B 42/02 |
| 2275429 | 11/1990 | Japan | G03B 42/02 |
| 2272530 | 11/1990 | Japan | G03B 42/02 |
| 2275432 | 11/1990 | Japan | G03B 42/02 |
| 2275435 | 11/1990 | Japan | G03B 42/02 |
| 2271343 | 11/1990 | Japan | G03B 42/02 |
| 2267679 | 11/1990 | Japan | G06F 15/70 |
| 2296235 | 12/1990 | Japan | G03B 42/02 |
| 532740 | 5/1993 | Japan | G03B 42/02 |

*Primary Examiner*—Jose L. Couso
*Assistant Examiner*—Matthew C. Bella
*Attorney, Agent, or Firm*—Sughrue, Mion, Zinn, Macpeak & Seas

[57] ABSTRACT

A first image signal representing a Magen radiation image is obtained by exposing a stimulable phosphor sheet, on which the Magen radiation image has been stored in a subdivision pattern composed of at least a single subdivision, to stimulating rays, which cause the stimulable phosphor sheet to emit light in proportion to the amount of energy stored thereon during its exposure to radiation, the emitted light being detected. The kind of the subdivision pattern of the Magen image is discriminated on the basis of the first image signal or information given by an image recording system, which carries out an image recording operation. The kind of an image recording pattern of the Magen image is determined from the kind of the subdivision pattern, which has been discriminated. Read-out conditions, under which a second image signal representing the Magen image is to be obtained by again exposing the stimulable phosphor sheet to stimulating rays, and/or image processing conditions, under which the second image signal having been obtained is to be image processed, are set in accordance with the kind of the image recording pattern, which has been determined.

11 Claims, 5 Drawing Sheets

METHOD FOR ADJUSTING READ-OUT AND PROCESSING CONDITIONS FOR MAGEN IMAGES

BACKGROUND OF THE INVENTION

FIELD OF THE INVENTION

This invention relates to a method for adjusting read-out conditions and/or image processing conditions for a Magen image, wherein read-out conditions, under which an image signal representing a radiation image of the Magen (i.e., the stomach) is to be obtained, and/or image processing conditions, under which the obtained image signal is to be processed, are adjusted. This invention also relates to a method for determining a Magen image recording pattern, wherein an image recording pattern in which a Magen image has been recorded is determined.

DESCRIPTION OF THE PRIOR ART

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, and the X-ray image is read out from the X-ray film and converted into an electric signal (image signal). The image signal is processed and then used for reproducing the X-ray image as a visible image on a photocopy, or the like. In this manner, a visible image having good image quality with high contrast, high sharpness, high graininess, or the like, can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428,and Japanese Unexamined Patent Publication No. 56(1981)-11395, it has been proposed to use stimulable phosphors in radiation image recording and reproducing systems. Specifically, a radiation image of an object, such as the human body, is stored on a sheet provided with a layer of the stimulable phosphor (hereinafter referred to as a stimulable phosphor sheet). The stimulable phosphor sheet is then scanned with stimulating rays, such as a laser beam, which cause it to emit light in proportion to the amount of energy stored thereon during its exposure to the radiation. The light emitted by the stimulable phosphor sheet when it is exposed to the stimulating rays is photoelectrically detected and converted into an electric image signal. The image signal is then used during the reproduction of the radiation image of the object as a visible image on a recording material, such as photographic film, on a display device, such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation, to which the stimulable phosphor sheet is exposed, varies over a wide range. More specifically, since the amount of light, which the stimulable phosphor sheet emits when being exposed to the stimulating rays, varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet, and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order to approximately ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (or the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing, which affects the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

As disclosed in, for example, U.S. Pat. No. 4,638,162 and Japanese Unexamined Patent Publication No. 61(1986)-280163, operations for calculating the values of the read-out conditions for the final readout and/or the image processing conditions are carried out by a group of algorithms which analyze an image signal (or a preliminary read-out image signal). A large number of image signals detected from a large number of radiation images are statistically processed. The algorithms which calculate the read-out conditions for the final readout and/or the image processing conditions are designed on the basis of the results obtained from this processing.

As examples of the algorithms which have heretofore been employed, methods are known wherein a probability density function of an image signal is created and analyzed, and the read-out conditions for the final readout and/or the image processing conditions are determined on the basis of the results of the analysis of the probability density function. Methods for determining the read-out conditions for the final readout and/or the image processing conditions on the basis of the results of an analysis of the probability density function of an image signal can be classified into the following:

(1) a method as disclosed in U.S. Pat. No. 4,682,028 wherein both the maximum value and the minimum value in the range resulting in a reproduced visible image containing the necessary image information are determined from a probability density function of an image signal, and, for example, the read-out conditions for the final readout are set such that, during the final readout, the image information represented by values of the emitted light signal falling within the range of the maximum value to the minimum value is detected accurately, (2) a method as disclosed in U.S. Pat. No. 4,638,162 wherein only the maximum value is determined from a probability density function of an image signal, a value obtained by subtracting a predetermined value from the maximum value is taken as the minimum value, and the range between the maximum value and the minimum value is taken as the range resulting in a visible image containing the necessary image information, (3) a method as disclosed in Japanese Unexamined Patent Publication No. 61(1986)-280163 wherein only the minimum value is determined from a probability density function of an image signal, a value obtained by adding a predetermined value to the minimum value is taken as the maximum value, and the range between the minimum value and the maximum value is taken as the range resulting in a visible image containing the necessary image information, (4) a method as proposed in U.S. Pat. No. 4,887,305 wherein a difference probability density function is used, (5) a method as disclosed in U.S. Pat. No. 4,950,894 wherein a cumulative probability density function is used, and (6) a method as proposed in U.S. patent application No. 08/060,058 wherein a probability density function is divided into a plurality of small regions by using a discrimination standard. The range of an image signal resulting in a visible image containing the necessary image information is determined with one of various methods, and the read-out conditions for the final readout and/or the image processing conditions are set with respect to said range.

In the manner described above, the final readout of each radiation image is carried out under the read-out conditions having been adjusted on the basis of the results of an analysis of the probability density function of the image signal, which probability density function directly represents the characteristics of the radiation image. Also, image processing is carried out on the image signal under the image processing conditions having been adjusted on the basis of the results of an analysis of the probability density function of the image signal. In such cases, for example, even if the range of the level of energy stored on the stimulable phosphor sheet during its exposure to the radiation fluctuates between image recording operations due to a difference in the object and the portion of the object the image of which is recorded, fluctuations in the dose of the radiation delivered to the stimulable phosphor sheet, and the like, a visible image can be obtained which has good image quality and can serve as an effective tool in, particularly, the efficient and accurate diagnosis of an illness. Specifically, a visible image can thus be obtained in which the necessary image information of the object is illustrated with an image density range appropriate for the use of the visible image.

When radiation images are recorded on recording media, such as stimulable phosphor sheets, a subdivision image recording operation is often carried out. With the subdivision image recording operation, the recording region on a single recording medium is divided into a plurality of subdivisions, and the respective subdivisions are exposed to radiation for image recording. The subdivision image recording operation is economical since, for example, when images of small object portions are recorded on large recording media, images of a plurality of object portions can be recorded on a single recording medium. Also, the speed with which radiation images are recorded and read out can be kept high.

In order for an image signal to be obtained from a recording medium, on which the subdivision image recording operation has been carried out, a need exists for a method with which a subdivision pattern of radiation images recorded on a recording medium can be determined. The applicant proposed various methods for automatically determining a subdivision pattern of radiation images which have been recorded on a recording medium in, for example, Japanese Patent Publication No. 5(1993)-32740 and Japanese Unexamined Patent Publication Nos. 2(1990)-267679, 2(1990)-272530, 2(1990)-275429, 2(1990)-275432, 2(1990)-275435, and 2(1990)-296235 and U.S. Pat. Nos. 4,829,181, 4,962,539, 5,042,074.

For example, U.S. Pat. No. 4,829,181 discloses a method for determining a subdivision pattern of radiation images, wherein a radiation image of an object is read out from a stimulable phosphor sheet, which carries the radiation image stored thereon by a radiation image recording operation, and an image signal representing the radiation image is thereby obtained, the method comprising the steps of:

i) in cases where a subdivision image recording operation has been carried out by exposing each of a plurality of predetermined subdivisions on the stimulable phosphor sheet to radiation, detecting prospective edge points, which are considered to be an edge of a subdivision line between the subdivisions, from image signal components of the image signal corresponding to a stimulable phosphor sheet region located at the boundary between the subdivisions, ii) discriminating whether the prospective edge points stand or do not stand in a straight line, and iii) determining an image subdivision pattern on the stimulable phosphor sheet by judging that the subdivision line is present in cases where the prospective edge points stand in a straight line, and judging that no subdivision line is present in cases where the prospective edge points do not stand in a straight line.

Also, U.S. Pat. No. 4,962,539 discloses a method for determining a radiation image layout pattern, comprising the steps of:

i) preparing a binary mask, which is composed of a binary signal representing a single type of a radiation image layout pattern on a stimulable phosphor sheet, or preparing a plurality of binary masks, which are composed of binary signals representing a plurality of types of radiation image layout patterns on a stimulable phosphor sheet, and ii) after an image has been obtained from an image read-out operation, determining a radiation image layout pattern by:

a) converting the image signal into a binary image signal, b) calculating a rating value, which represents a degree of pattern matching between the binary image signal and one of the binary masks, for each of combinations of the binary image signal and the binary masks, c) finding the highest rating value that represents the highest degree of pattern matching among the rating values thus calculated, and d) comparing the highest rating value with a predetermined value representing a predetermined degree of pattern matching.

Further, U.S. Pat. No. 4,962,539 discloses a method for determining a subdivision pattern of radiation images, comprising the steps of:

i) in cases where a subdivision image recording operation has been carried out on a recording medium, calculating a characteristic value, which represents a degree of variation of values of image signal components of an image signal corresponding to a recording medium region located at a boundary between subdivisions, and ii) determining an image subdivision pattern on the recording medium by judging that subdivision has been effected at the recording medium region in cases where the characteristic value is comparatively small, and judging that no subdivision has been effected at the recording medium region in cases where the characteristic value is comparatively large.

As described above, various other methods for determining a subdivision pattern of radiation images have also been proposed and can be employed.

Figure 2A:
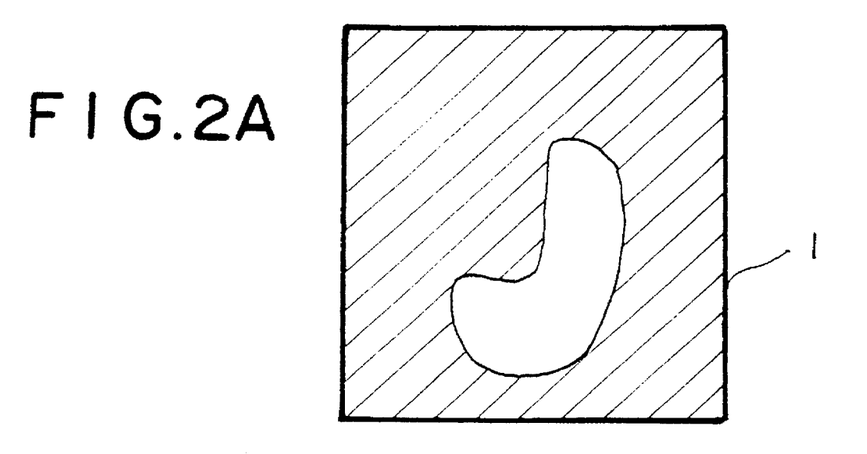
FIGS. 2A, 2B, and 2C are schematic views showing an ordinary image of the stomach filled with contrast media, a double-contrasted image, and a pressed stomach image, respectively.
Figure 2B:
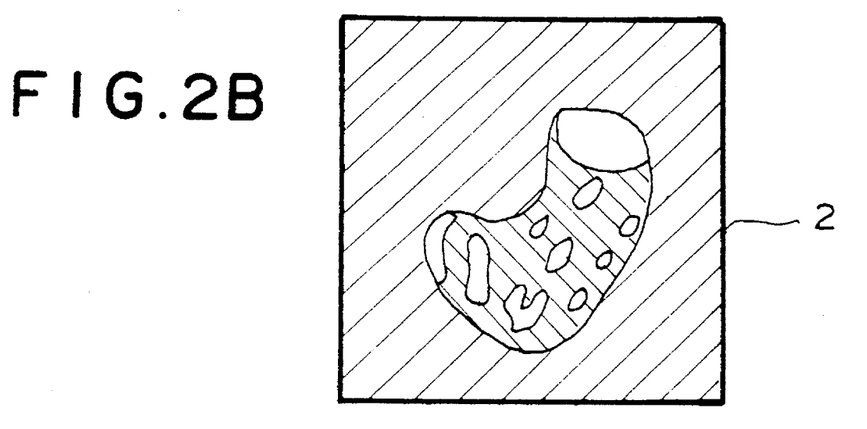
Figure 2C:
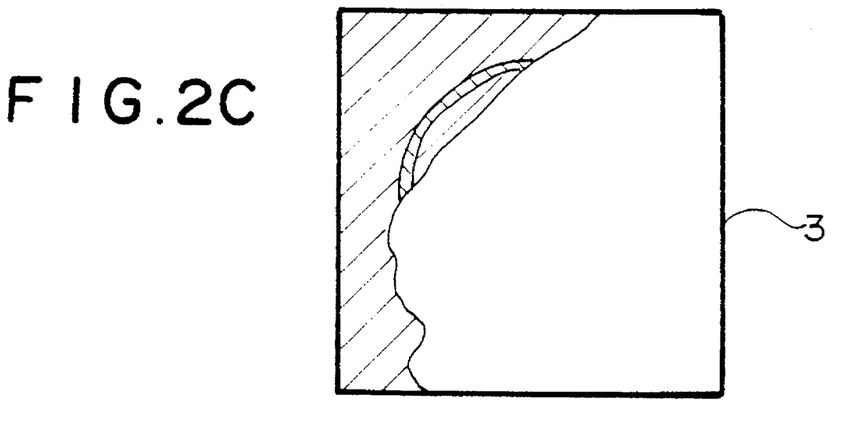

As examples of human body images, Magen (i.e. stomach) images have heretofore been used widely. In order to facilitate the diagnosis of the state of the stomach, Magen images are ordinarily contrasted with contrast media, such as barium, injected into the stomach. Such that the diagnosis may be carried out accurately, the Magen images are recorded in various image recording patterns. For example, the image recording patterns of the Magen images include a pattern of an ordinary image 1 of the stomach filled with the contrast media as shown in FIG. 2A, a pattern of a double-contrasted image 2 as shown in FIG. 2B, and a pattern of a pressed stomach image 3 having been recorded as shown in FIG. 2C by pressing the stomach so as to spread the region of the contrast media therein.

Image processing is also carried out on a Magen image such that a visible Magen image may be obtained which has good image quality and can serve as an effective tool in the efficient and accurate diagnosis of an illness. However, the size of the region of the contrast media, such as barium, having a low image density as a whole varies among the ordinary image of the stomach filled with the contrast media, the double-contrasted image, and the pressed stomach image. Therefore, in cases where the conventional method for adjusting the read-out conditions for the final readout and/or the image processing conditions is carried out on Magen images, appropriate conditions can be determined only for a single type of Magen image (e.g. only for the ordinary image of the stomach filled with the contrast media). Specifically, in such cases, the read-out conditions for the final readout and/or the image processing conditions, which are appropriate for each type of the Magen image, cannot be determined.

Therefore, it is considered to discriminate whether a Magen image is the ordinary image of the stomach filled with the contrast media, or is the double-contrasted image, or is the pressed stomach image before the final readout or the image processing is carried out on the Magen image, and then to determine the read-out conditions for the final readout and/or the image processing conditions such that they may be appropriate for each image. However, before the Magen image is reproduced as a visible image, it has heretofore been difficult to discriminate in which image recording pattern the Magen image was recorded.

SUMMARY OF THE INVENTION

The primary object of the present invention is to provide a method for adjusting read-out conditions and/or image processing conditions for a Magen image wherein, even if the image recording pattern of a Magen image varies, appropriate read-out conditions for a final readout and/or appropriate image processing conditions are set for each image recording pattern.

Another object of the present invention is to provide a method for determining an image recording pattern of a Magen image, wherein an image recording pattern in which a Magen image has been recorded is determined.

The present invention provides a method for adjusting read-out conditions and/or image processing conditions for a Magen image, wherein a first image signal representing a Magen radiation image is obtained by exposing a stimulable phosphor sheet, on which the Magen radiation image has been stored in a subdivision pattern composed of at least a single subdivision, to stimulating rays, which cause the stimulable phosphor sheet to emit light in proportion to the amount of energy stored thereon during its exposure to radiation, the emitted light being detected, a second image signal representing the Magen radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a Magen image comprising the steps of:

i) discriminating the kind of the subdivision pattern of the Magen image on the basis of the first image signal or information given by an image recording system, which carries out an image recording operation, ii) determining the kind of an image recording pattern of the Magen image from the kind of the subdivision pattern, which has been discriminated, and iii) setting the read-out conditions and/or the image processing conditions in accordance with the kind of the image recording pattern, which has been determined.

The present invention also provides a method for adjusting image processing conditions for a Magen image, wherein an image signal representing a Magen radiation image, which has been recorded in a subdivision pattern composed of at least a single subdivision, is obtained, and image processing conditions, under which the image signal is to be image processed, are adjusted, the method for adjusting image processing conditions for a Magen image comprising the steps of:

i) discriminating the kind of the subdivision pattern of the Magen image on the basis of the image signal or information given by an image recording system, which carries out an image recording operation, ii) determining the kind of an image recording pattern of the Magen image from the kind of the subdivision pattern, which has been discriminated, and iii) setting the image processing conditions in accordance with the kind of the image recording pattern, which has been determined.

The subdivision pattern includes various subdivision patterns, such as a two-on-one subdivision pattern and a four-on-one subdivision pattern, as well as a one-on-one pattern.

The term "image recording pattern" as used herein means the pattern of the ordinary image of the stomach filled with the contrast media, the pattern of the double-contrasted image, and the pattern of the pressed stomach image.

In the method for adjusting read-out conditions and/or image processing conditions for a Magen image and the method for adjusting image processing conditions for a Magen image in accordance with the present invention, different read-out conditions and/or different image processing conditions may be set for the respective Magen images recorded in the subdivisions divided in the subdivision pattern. Alternatively, the same read-out conditions and/or the same image processing conditions may be set for the respective Magen images recorded in the subdivisions divided in the subdivision pattern.

The present invention further provides a method for determining an image recording pattern of a Magen image, wherein an image recording pattern of a Magen radiation image, which has been recorded in a subdivision pattern composed of at least a single subdivision, is determined, the method for determining an image recording pattern of a Magen image comprising the steps of:

i) discriminating the kind of the subdivision pattern of the Magen image on the basis of an image signal, which represents the Magen radiation image, or information given by an image recording system, which carries out an image recording operation, and ii) determining the kind of the image recording pattern of the Magen image from the kind of the subdivision pattern, which has been discriminated.

Ordinarily, such that the diagnosis of the Magen may be made easily, Magen images to be used in making the diagnosis of the Magen are recorded in various subdivision patterns and in various image recording patterns. Also, there is a certain relationship between the kind of the subdivision pattern and the kind of the image recording pattern. For example, in cases where the subdivision pattern is the one-on-one pattern, the Magen image is recorded in the image recording pattern of the ordinary image of the stomach filled with the contrast media or the double-contrasted image. In cases where the subdivision pattern is the two-on-one pattern, the Magen images are recorded in the image recording pattern of the double-contrasted image. In cases where the subdivision pattern is the four-on-one pattern, the Magen images are recorded in the image recording pattern of the pressed stomach image.

The present invention is based on the findings described above. Specifically, with the method for adjusting read-out conditions and/or image processing conditions for a Magen image and the method for adjusting image processing conditions for a Magen image in accordance with the present invention, the kind of the subdivision pattern of the Magen image is discriminated, and the kind of the image recording pattern of the Magen image is then determined from the kind of the subdivision pattern, which has been discriminated. Thereafter, the read-out conditions, under which the image signal representing the Magen image is to be obtained, and/or the image processing conditions, under which the image signal is to be processed, are set in accordance with the kind of the image recording pattern, which has been determined. Therefore, it can be determined that the image recording pattern is the pattern of the ordinary image of the stomach filled with the contrast media or the pattern of the double-contrasted image when the subdivision pattern is the one-on-one pattern, that the image recording pattern is the pattern of the double-contrasted image when the subdivision pattern is the two-on-one subdivision pattern, and that the image recording pattern is the pattern of the pressed stomach image when the subdivision pattern is the four-on-one subdivision pattern. Thereafter, the read-out conditions and/or the image processing conditions can be set in accordance with the kind of the image recording pattern. The image read-out operation can thus be carried out under the read-out conditions appropriate for each image, and the image processing operation can be carried out under the image processing conditions appropriate for each image. In this manner, a visible image can be obtained which has good image quality and can serve as an effective tool in the efficient and accurate diagnosis of an illness.

DESCRIPTION OF THE PREFERRED EMBODIMENTS

The present invention will hereinbelow be described in further detail with reference to the accompanying drawings.

In the embodiment described below, the method for adjusting read-out conditions and/or image processing conditions for a Magen image in accordance with the present invention is applied to a radiation image recording and reproducing system in which a stimulable phosphor sheet is utilized.

Figure 1:
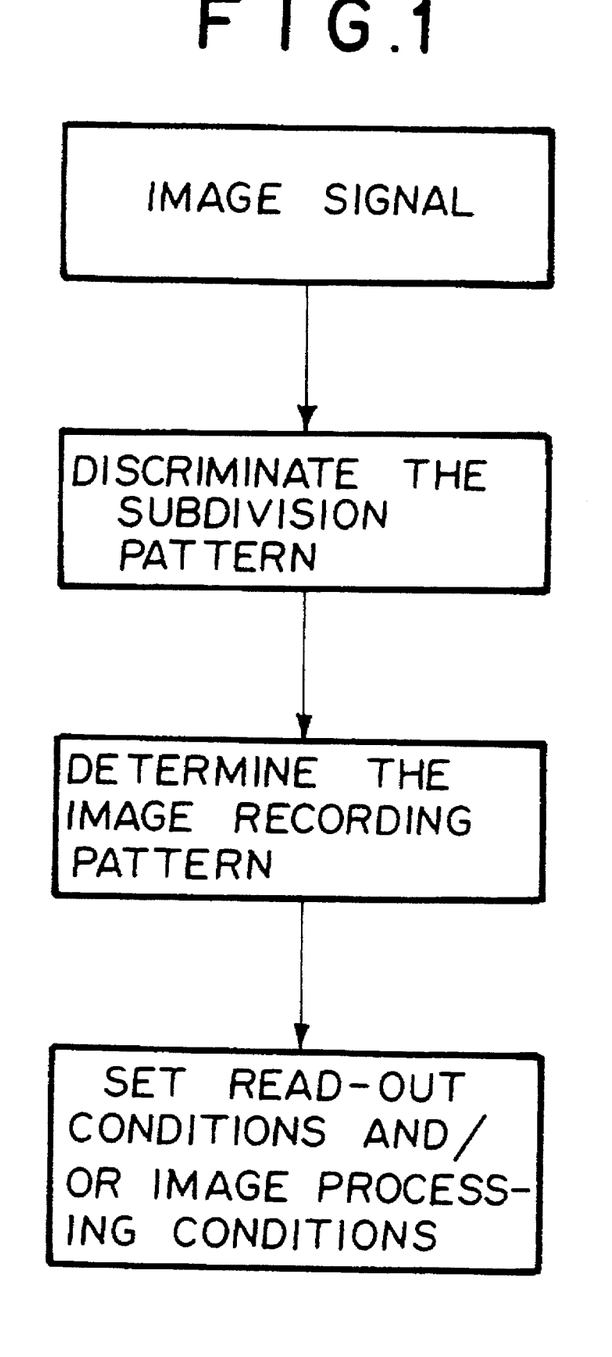
FIG. 1 is a block diagram showing the fundamental concept behind the method for adjusting read-out conditions and/or image processing conditions for a Magen image in accordance with the present invention.

FIG. 1 shows the fundamental concept behind the method for adjusting read-out conditions and/or image processing conditions for a Magen image in accordance with the present invention.

As illustrated in FIG. 1, with the method for adjusting read-out conditions and/or image processing conditions for a Magen image in accordance with the present invention, the kind of the subdivision pattern of a Magen image is discriminated on the basis of a first image signal, which represents the Magen radiation image and which has been detected from a stimulable phosphor sheet carrying the Magen radiation image stored thereon. The kind of the image recording pattern of the Magen image is then determined from the kind of the subdivision pattern, which has been discriminated. Thereafter, the read-out conditions, under which a second image signal representing the Magen image is to be obtained, and/or the image processing conditions, under which the second image signal is to be processed, are set in accordance with the kind of the image recording pattern, which has been determined.

An X-ray image read-out apparatus provided with a computer system for carrying out an embodiment of the method for adjusting read-out conditions and/or image processing conditions for a Magen image in accordance with the present invention will be described hereinbelow.

Figure 5:
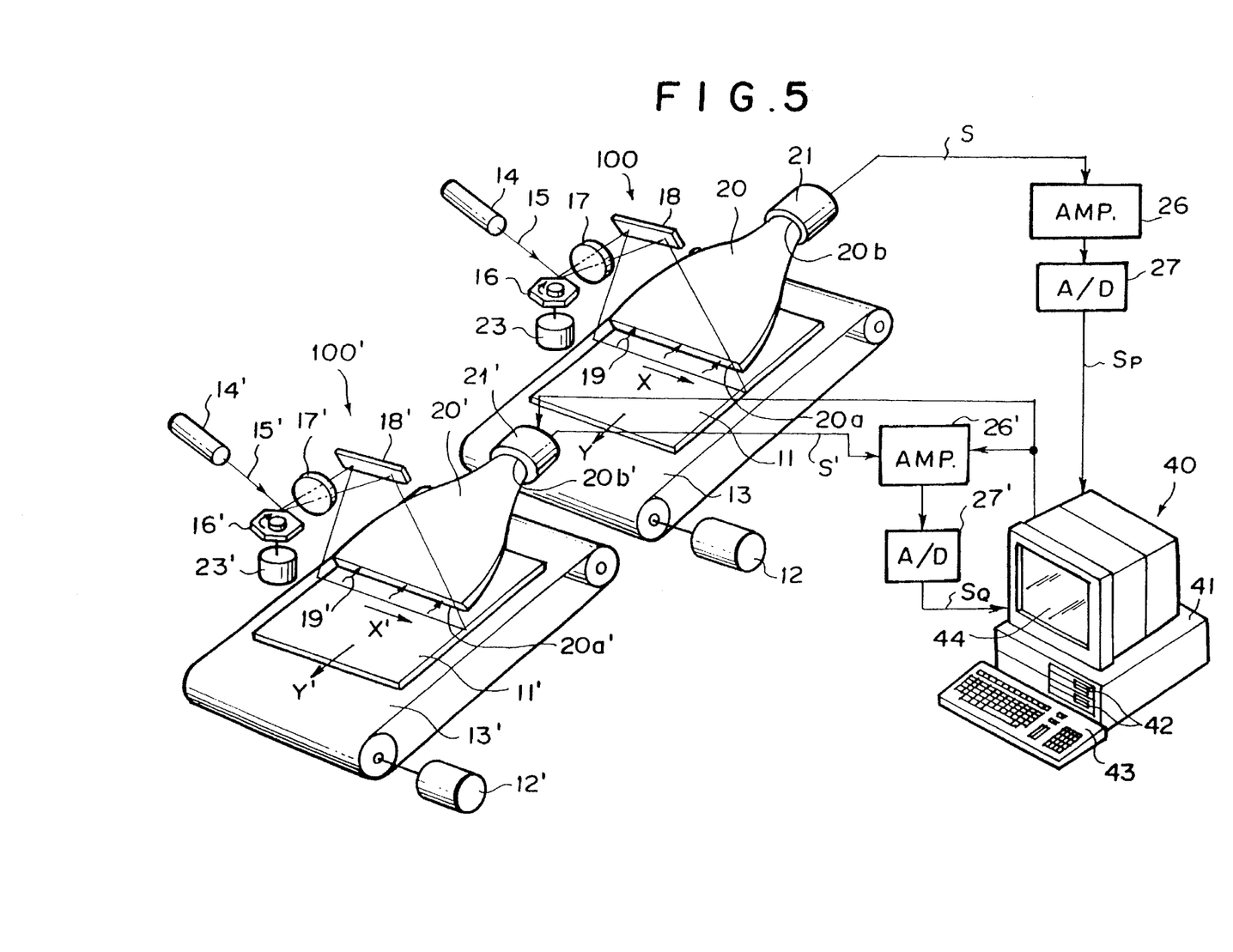
FIG. 5 is a perspective view showing an example of an X-ray image read-out apparatus provided with a computer system for carrying out an embodiment of the method for adjusting read-out conditions and/or image processing conditions for a Magen image in accordance with the present invention.

FIG. 5 is a perspective view showing an example of an X-ray image read-out apparatus, which is employed in the embodiment of the method for adjusting read-out conditions and/or image processing conditions for a Magen image in accordance with the present invention, and an example of a computer system, in which an apparatus for adjusting read-out conditions and/or image processing conditions for a Magen image in accordance with the present invention is employed. In this embodiment, by way of example, a stimulable phosphor sheet is used, and a preliminary readout is carried out.

In an X-ray image recording apparatus (not shown), an X-ray image of the Magen serving as an object has been stored on a stimulable phosphor sheet 11. The stimulable phosphor sheet 11, on which the X-ray image has been stored, is placed at a predetermined position in a preliminary read-out means 100, which carries out a preliminary readout by scanning the stimulable phosphor sheet 11 with a light beam having a low energy level, thereby releasing only part of the energy from the stimulable phosphor sheet 11, which energy was stored during its exposure to radiation. The stimulable phosphor sheet 11 is conveyed in a sub-scanning direction indicated by the arrow Y by a sheet conveyance means 13, which is constituted of an endless belt, or the like, and which is operated by a motor 12. A laser beam 15 which has a low energy level is produced by a laser beam source 14, and is reflected and deflected by a rotating polygon mirror 16 which is quickly rotated by a motor 23 in the direction indicated by the arrow. The laser beam 15 then passes through a converging lens 17, which may be constituted of an fθ lens, or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material, such as an acrylic plate, and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the X-ray image, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the light 19, which was emitted from each of picture elements in the X-ray image stored on the stimulable phosphor sheet 11.

In the preliminary readout, read-out conditions, i.e. the voltage applied to the photomultiplier 21 and the amplification factor of the logarithmic amplifier 26, are adjusted so that image information can be detected accurately even if the amount of energy stored on the stimulable phosphor sheet 11 during its exposure to radiation varies over a wide range.

The preliminary read-out image signal SP, which has been obtained in the manner described above, is fed into a computer system 40. The computer system 40 is provided with an example of the apparatus for adjusting read-out conditions and/or image processing conditions for a Magen image in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

In the computer system 40, the kind of the subdivision pattern of the Magen image, i.e. whether the subdivision pattern is the one-on-one, two-on-one, or four-on-one pattern, is discriminated on the basis of the preliminary read-out image signal SP. In order to discriminate the subdivision pattern, any of known methods may be employed. For example, a method disclosed in Japanese Unexamined Patent Publication No. 2(1990)-267679 may be employed which comprises the steps of: finding the profile of image signal components of an image signal corresponding to positions located along each of lines, which extend in directions crossing a boundary between radiation images, determining that an upwardly or downwardly convex vertex appearing in the profile is a prospective boundary point, taking a line connecting the thus determined prospective boundary points as the boundary between the radiation images, and thereby determining the subdivision pattern on a recording medium. Alternatively, a method disclosed in Japanese Unexamined Patent Publication No. 2(1990)-271343 may be employed wherein the subdivision pattern on a recording medium is determined from the presence or absence of image signal components of an image signal (corresponding to a background region), which take values not smaller than a predetermined value, in a middle region of an image and from the shape of distribution of the image signal components of the image signal.

Figure 3A:
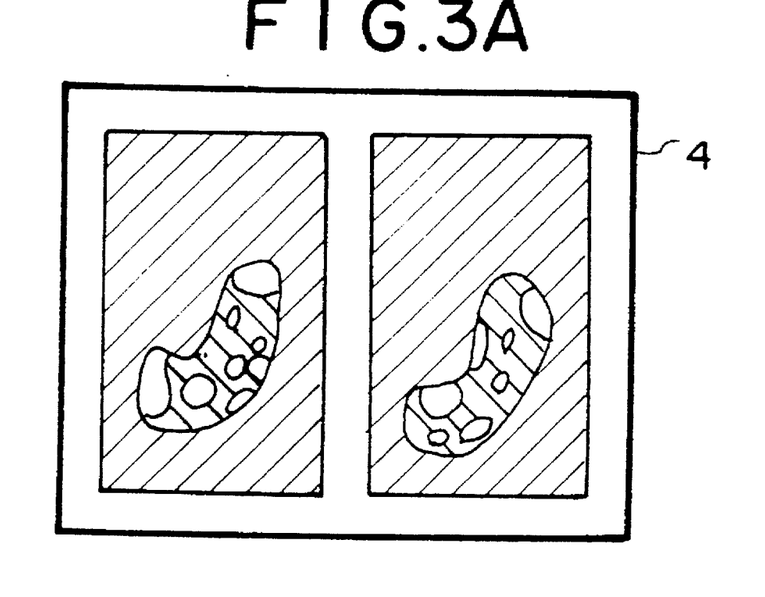
FIG. 3A and 3B are schematic views showing subdivision patterns of double-contrasted images and pressed stomach images.
Figure 3B:
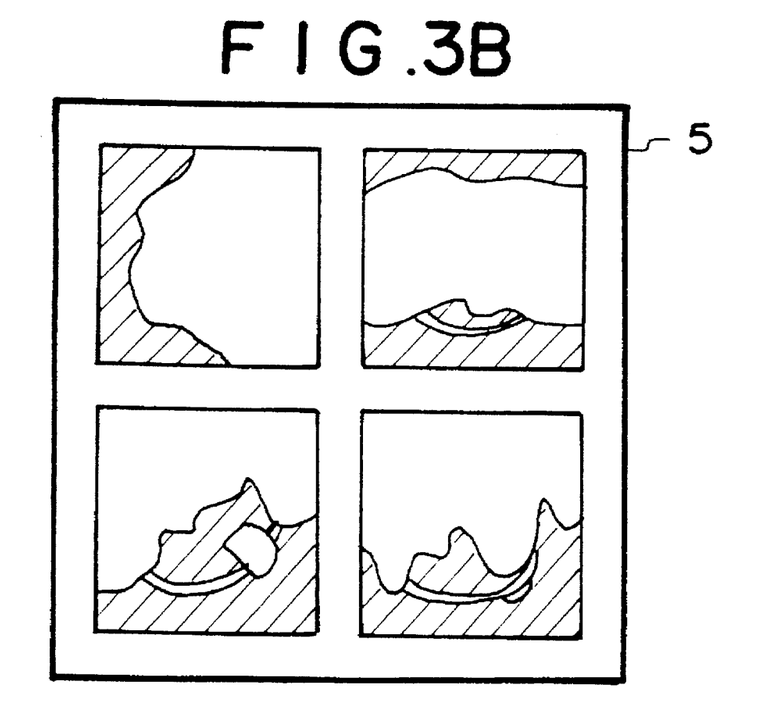

After the kind of the subdivision pattern has been discriminated in the manner described above, the kind of the image recording pattern is determined from the kind of the subdivision pattern. Specifically, Magen images have characteristics such that the image recording pattern is the pattern of the ordinary image of the stomach filled with the contrast media or the pattern of the double-contrasted image when the subdivision pattern is the one-on-one pattern, the image recording pattern is the pattern of double-contrasted images 4 as shown in FIG. 3A when the subdivision pattern is the two-on-one subdivision pattern, and the image recording pattern is the pattern of pressed stomach images 5 as shown in FIG. 3B when the subdivision pattern is the four-on-one subdivision pattern. Therefore, in cases where the subdivision pattern has been discriminated as the one-on-one pattern, it is determined that the Magen image is the ordinary image of the stomach filled with the contrast media or the double-contrasted image. In cases where the subdivision pattern has been discriminated as the two-on-one pattern, it is determined that the Magen images are the double-contrasted images. Also, in cases where the subdivision pattern has been discriminated as the four-on-one pattern, it is determined that the Magen images are the pressed stomach images.

Figure 4A:
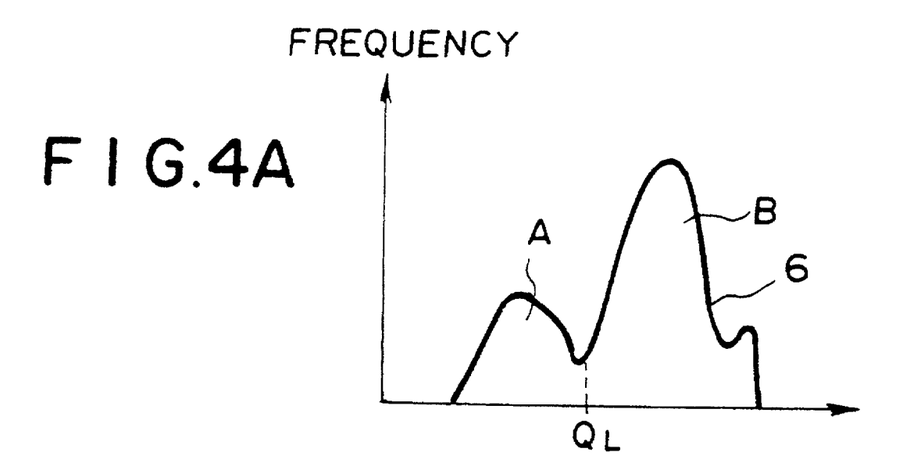
FIGS. 4A, 4B, and 4C are graphs showing probability density functions of an ordinary image of the stomach filled with contrast media, a double-contrasted image, and a pressed stomach image, respectively.
Figure 4B:
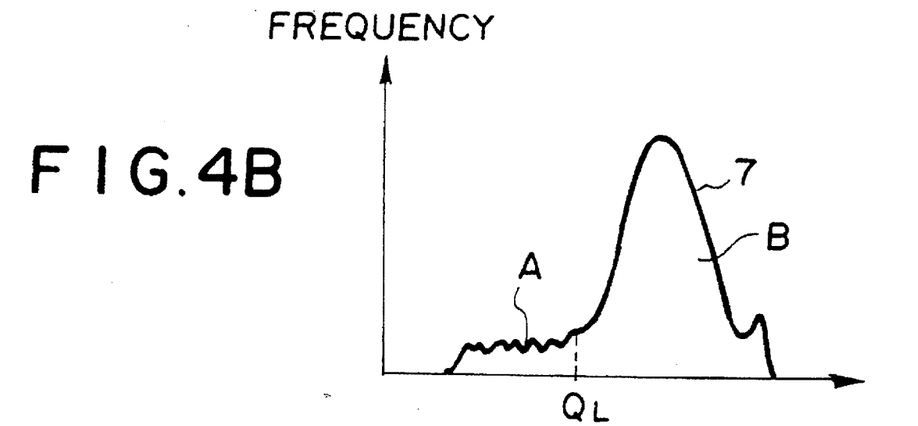
Figure 4C:
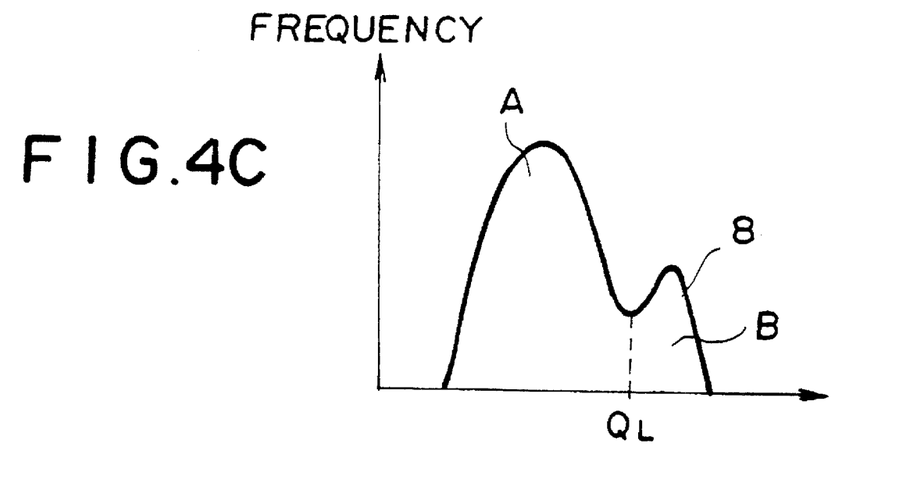

After the kind of the image recording pattern has been determined in the manner described above, the read-out conditions for the final readout are set in accordance with each image recording pattern. First, the probability density function of the preliminary read-out image signal SP is created and analyzed. The probability density functions of image signals corresponding to the respective image recording patterns take characteristic profiles different from one another. Specifically, as shown in FIGS. 4A, 4B, and 4C, probability density functions 6, 7, and 8 are respectively obtained from the image signals representing the ordinary image of the stomach filled with the contrast media, the double-contrasted image, and the pressed stomach image. In each of the probability density functions 6, 7, and 8 shown in FIGS. 4A, 4B, and 4C, the part A corresponds to regions of the Magen contrasted by the contrast media, and the part B corresponds to regions other than the regions of the Magen contrasted with the contrast media. As indicated by the probability density functions 6, 7, and 8, as for Magen images, the shape of the probability density function, in particular the shape and the area of the low-density region contrasted by the contrast media, such as barium, varies for different kinds of the image recording patterns, i.e. among the ordinary image of the stomach filled with the contrast media, the double-contrasted image, and the pressed stomach image. Therefore, such that a visible image may be obtained which has good image quality and can serve as an effective tool in the efficient and accurate diagnosis of an illness, the final readout should be carried out under the read-out conditions appropriate for each kind of the image recording pattern, and the image processing operation should be carried out under the image processing conditions appropriate for each kind of the image recording pattern. Accordingly, in the method for adjusting read-out conditions and/or image processing conditions for a Magen image in accordance with the present invention the kind of the image recording pattern is determined in accordance with the kind of the subdivision pattern, and the final readout is carried out under the read-out conditions appropriate for each image recording pattern. The read-out conditions for the final readout include the sensitivity Sk and the latitude Gp during the final readout. By way of example, the voltage applied to a photomultiplier 21' and the amplification factor of a logarithmic amplifier 26' are controlled in accordance with the sensitivity Sk and the latitude Gp, which have thus been determined.

The latitude Gp corresponds to the ratio of the largest amount of emitted light, which is capable of being accurately converted into an image signal during the final readout, to the smallest amount of emitted light, which is capable of being accurately converted into an image signal during the final readout. The sensitivity Sk corresponds to the photoelectric conversion factor, which represents to what image signal level a predetermined amount of emitted light is to be converted.

Therefore, the read-out conditions for the final readout appropriate for each image recording pattern are determined on the basis of the results of an analysis of the probability density function of the image signal. For this purpose, the method disclosed in U.S. Pat. No. 4,638,162 or Japanese Unexamined Patent Publication No. 61(1986)-280163 may be employed. Specifically, in cases where the Magen image has been recorded in the one-on-one pattern, the read-out conditions for the final readout, which are appropriate for the ordinary image of the stomach filled with the contrast media or the double-contrasted image, are determined. In cases where the Magen images have been recorded in the two-on-one pattern, the read-out conditions for the final readout, which are appropriate for the double-contrasted image, are determined. Also, in cases where the Magen images have been recorded in the four-on-one pattern, the read-out conditions for the final readout, which are appropriate for the pressed stomach image, are determined.

A stimulable phosphor sheet 11' on which the preliminary readout has been finished is placed at a predetermined position in the final read-out means 100' and scanned with a laser beam 15' having an energy level higher than that of the laser beam 15 used during the preliminary readout. In this manner, an image signal is detected under the read-out conditions which have been determined in the manner described above. The configuration of the final read-out means 100' is nearly the same as that of the preliminary read-out means 100, and therefore elements corresponding to those constituting the preliminary read-out means 100 are numbered with corresponding primed reference numerals in FIG. 5.

After the image signal is digitized in an A/D converter 27', the resulting image signal SQ is fed into the computer system 40. The computer system 40 carries out appropriate image processing on the image signal SQ in accordance with the image recording pattern of the Magen image. After being image processed, the image signal is fed into a reproducing apparatus (not shown), which reproduces a visible image from the image signal.

In the aforesaid embodiment, the read-out conditions for the final readout are adjusted by the computer system 40. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ representing the Magen image. The computer system 40 may also adjust both the read-out conditions for the final readout and the image processing conditions.

The aforesaid embodiment is applied to the radiation image read-out apparatus wherein the preliminary readout is carried out. However, the method for adjusting read-out conditions and/or image processing conditions for a Magen image in accordance with the present invention is also applicable to radiation image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by the computer system 40. The image signal is processed under the calculated image processing conditions.

Also, in the aforesaid embodiment, after the kind of the image recording pattern has been determined, the read-out conditions for the final readout and/or the image processing conditions, which are appropriate for each image recording pattern, are set. Alternatively, the results of the determination of the kind of the image recording pattern may be utilized when the shape and location of an irradiation field on a recording medium are detected as disclosed in, for example, Japanese Unexamined Patent Publication No. 63(1988)-183434. Specifically, as for Magen images, when the number of subdivisions in the subdivision pattern becomes larger, the areas of the regions contrasted by the contrast media, such as barium, become larger, and the regions contrasted by the contrast media overlap at more positions upon sides of the irradiation field. As a result, as the number of subdivisions in the subdivision pattern becomes larger, it becomes more difficult to detect the shape and location of the irradiation field. Therefore, in such cases, the threshold value used in processing the differentiated values, which are obtained from differentiation, with the threshold value may be decreased in accordance with the discriminated subdivision pattern such that the shape and location of the irradiation field can be detected more easily. Also, the manner in which an image is displayed may be changed in accordance with the determined image recording pattern.

In the embodiment described above, the image stored on a stimulable phosphor sheet is read out. The method in accordance with the present invention is also applicable when an image processing operation, or the like, is carried out on an image signal obtained by reading out a Magen image recorded on conventional X-ray film.

Further, in the embodiment described above, the subdivision pattern is discriminated in the computer system in accordance with the image signal having been detected from the stimulable phosphor sheet. Alternatively, information concerning the subdivision pattern may be fed from the image recording apparatus, which was used to record the Magen image, into the computer system.

Furthermore, in the embodiment described above, the Magen images recorded in the respective subdivisions divided in the subdivision pattern may be read out under different read-out conditions for the final readout or may be read out under the same read-out conditions for the final readout. Also, when the image processing operation is carried out on the image signal representing the Magen images in the aforesaid embodiment, different image processing conditions may be set for the respective subdivisions divided in the subdivision pattern. Alternatively, the same image processing conditions may be set for the respective subdivisions divided in the subdivision pattern. Even if the image recording pattern is the same, it will often occur that the probability density function of the obtained image signal varies. Therefore, such that the image processing operation can be carried out more accurately, the image processing conditions should preferably be set for each of the subdivisions.

What is claimed is:

1. A method for adjusting at least one of read-out conditions and image processing conditions for a Magen image, wherein a first image signal representing a Magen radiation image is obtained by exposing a stimulable phosphor sheet, on which the Magen radiation image has been stored in a subdivision pattern composed of at least a single subdivision, to stimulating rays, which cause the stimulable phosphor sheet to emit light in proportion to the amount of energy stored thereon during its exposure to radiation, the emitted light being detected, a second image signal representing the Magen radiation image is thereafter obtained by again exposing the stimulable phosphor sheet to stimulating rays, the light emitted by the stimulable phosphor sheet being detected, and at least one of read-out conditions, under which the second image signal is to be obtained, and image processing conditions, under which the second image signal having been obtained is to be image processed, are adjusted on the basis of the first image signal, the method comprising the steps of:
i) discriminating the kind of the subdivision pattern of the Magen image on the basis of the first image signal or information given by an image recording system, which carries out an image recording operation, to determine whether the subdivision pattern is a one-on-one pattern, two-on-one pattern or four-on-one pattern,
ii) determining, based on the kind of subdivision pattern which has been discriminated, an image recording pattern of the Magen image to be an ordinary image recording pattern when the subdivision pattern is a one-on-one pattern, a double-contrasted image recording pattern when the subdivision pattern is a two-on-one pattern or a pressed stomach image recording pattern when the subdivision pattern is a four-on-one pattern, and
iii) setting at least one of the read-out conditions and the image processing conditions in accordance with the image recording pattern, which has been determined.

2. A method as defined in claim 1, wherein at least one of different read-out conditions and different image processing conditions are set for respective Magen images, which have been stored in subdivisions divided in the subdivision pattern.

3. A method as defined in claim 1, wherein at least one of the same read-out conditions and the same image processing conditions are set for respective Magen images, which have been stored in subdivisions divided in the subdivision pattern.

4. A method for adjusting image processing conditions for a Magen image, wherein an image signal representing a Magen radiation image, which has been recorded in a subdivision pattern composed of at least a single subdivision, is obtained, and image processing conditions, under which the image signal is to be image processed, are adjusted, the method comprising the steps of:

i) discriminating the kind of the subdivision pattern of the Magen image on the basis of the image signal or information given by an image recording system, which carries out an image recording operation, to determine whether the subdivision pattern is a one-on-one pattern, two-on-one pattern or four-on-one pattern, ii) determining, based on the kind of subdivision pattern which has been discriminated, an image recording pattern of the Magen image to be an ordinary image recording pattern when the subdivision pattern is a one-on-one pattern, a double-contrasted image recording pattern when the subdivision pattern is a two-on-one pattern, or a pressed stomach image recording pattern when the subdivision pattern is a four-on-one pattern, and iii) setting image processing conditions in accordance with the kind of the image recording pattern, which has been determined.

5. A method for adjusting image processing conditions for a Magen image as defined in claim 4 wherein different image processing conditions are set for respective Magen images, which have been recorded in subdivisions divided in the subdivision pattern.

6. A method for adjusting image processing conditions for a Magen image as defined in claim 4 wherein the same image processing conditions are set for respective Magen images, which have been recorded in subdivisions divided in the subdivision pattern.

7. A method for adjusting image processing conditions for a Magen image as defined in claim 4 wherein the Magen image has been stored on a stimulable phosphor sheet.

8. A method for adjusting image processing conditions for a Magen image as defined in claim 4 wherein the Magen image has been recorded on photographic film.

9. A method for determining an image recording pattern of a Magen image, wherein an image recording pattern of a Magen radiation image, which has been recorded in a subdivision pattern composed of at least a single subdivision, is determined, the method comprising the steps of:

i) discriminating the kind of the subdivision pattern of the Magen image on the basis of an image signal, which represents the Magen radiation image, or information given by an image recording system, which carries out an image recording operation, to determine whether the subdivision pattern is a one-on-one pattern, two-on-one pattern or four-on-one pattern, and ii) determining, based on the kind of subdivision pattern which has been discriminated, an image recording pattern of the Magen image to be an ordinary image recording pattern when the subdivision pattern is a one-on-one pattern, a double-contrasted image recording pattern when the subdivision pattern is a two-on-one pattern, or pressed stomach image recording pattern when the subdivision pattern is a four-on-one pattern.

10. A method for determining an image recording pattern of a Magen image as defined in claim 9 wherein the Magen image has been stored on a stimulable phosphor sheet.

11. A method for determining an image recording pattern of a Magen image as defined in claim 9 wherein the Magen image has been recorded on photographic film.

\* \* \* \* \*